(12) United States Patent
Jones

(10) Patent No.: US 10,684,165 B2
(45) Date of Patent: Jun. 16, 2020

(54) MEASUREMENT AND CONTROL OF LIGHTING

(71) Applicant: SHIELDS ENERGY SERVICES LIMITED, Leigh-On-Sea (GB)

(72) Inventor: Christopher Jones, Leigh-On-Sea Essex (GB)

(73) Assignee: SHIELDS ENERGY SERVICES LIMITED, Essex (GB)

( * ) Notice: Subject to any disclaimer, the term of this patent is extended or adjusted under 35 U.S.C. 154(b) by 0 days.

(21) Appl. No.: 16/063,111

(22) PCT Filed: Dec. 14, 2016

(86) PCT No.: PCT/GB2016/053928
§ 371 (c)(1),
(2) Date: Jun. 15, 2018

(87) PCT Pub. No.: WO2017/103581
PCT Pub. Date: Jun. 22, 2017

(65) Prior Publication Data
US 2018/0372537 A1    Dec. 27, 2018

(30) Foreign Application Priority Data
Dec. 16, 2015   (GB) .................................. 1522184.9

(51) Int. Cl.
*G01J 1/42*    (2006.01)
*H05B 47/11*    (2020.01)
*H05B 47/16*    (2020.01)

(52) U.S. Cl.
CPC ............ *G01J 1/4204* (2013.01); *H05B 47/11* (2020.01); *H05B 47/16* (2020.01);
(Continued)

(58) Field of Classification Search
CPC ............... G01J 1/4204; H05B 37/0281; H05B 37/0218; G09G 2360/144; Y02B 20/42; Y02B 20/46
See application file for complete search history.

(56) References Cited

U.S. PATENT DOCUMENTS

| 2003/0090210 A1 | 5/2003 | Bierman |
| 2013/0229115 A1* | 9/2013 | Pandharipande .. H05B 37/0218 315/152 |

(Continued)

FOREIGN PATENT DOCUMENTS

WO    WO 2011/149473 A1    12/2011

OTHER PUBLICATIONS

Combined Search and Examination Report under Sections 17 and 18(2) (6 pages) dated Jun. 15, 2016 from United Kingdom priority Application No. 1522184.9.

(Continued)

*Primary Examiner* — Amit Chatly
(74) *Attorney, Agent, or Firm* — Brinks Gilson & Lione; John C. Freeman

(57) ABSTRACT

A method of estimating light intensity at a target location remote from a light sensor by providing a light sensor at a measuring location and temporarily providing a light sensor at a remote target location; exposing the measuring and target locations to a rand light intensities; constructing a calibration relationship between measured light intensity at the measuring and target location; and subsequently measuring light intensity at the measuring location; and using the calibration relationship to estimate light intensity at the target location. Lighting systems employing such a method are also provided.

5 Claims, 3 Drawing Sheets

(52) U.S. Cl.
CPC ........ *G09G 2360/144* (2013.01); *Y02B 20/42* (2013.01); *Y02B 20/46* (2013.01)

(56) References Cited

U.S. PATENT DOCUMENTS

2013/0258684 A1* 10/2013 Yang .................. A01G 9/26
362/386
2014/0292208 A1 10/2014 Chemel et al.

OTHER PUBLICATIONS

International Search Report (two pages) dated Feb. 21, 2017 from PCT/GB2016/053928.
Written Opinion of the International Searching Authority (six pages) dated Feb. 21, 2017 from PCT/GB2016/053928.
International Preliminary Report on Patentability (7 pages) from PCT/GB2016/053928 dated Jun. 19, 2018.

* cited by examiner

MEASUREMENT AND CONTROL OF LIGHTING

This application is a National Stage application of International Application No. PCT/GB2016/053928, filed Dec. 14, 2016, the entire contents of which are incorporated herein by reference.

Applicant claims, under 35 U.S.C. § 119, the benefit of priority of the filing date of Dec. 16, 2015 of a British patent application, copy attached, Serial Number 1522184.9, filed on the aforementioned date, the entire contents of which are incorporated herein by reference.

FIELD OF THE INVENTION

The invention relates to methods and systems for estimating light intensity at locations remote from light sensors, and lighting control systems embodying such methods and systems.

BACKGROUND AND PRIOR ART

The measurement and control of light levels in the built environment is important for many reasons. In respect of safety, areas need to be well-enough lit to allow users of the environment to move around safely, and that sufficient light must be provided such that hazards may be readily seen. Suitable light levels are also required for the comfort and convenience of users, who might e.g. be in a situation where they wish to read, or transact business. From an environmental and commercial viewpoint, it is also important that artificial light is not used when it is not necessary. This saves money, and lessens the impact of energy use on the environment.

Most built environments obtain their light through a combination of daylight and artificial light, with the balance of one over the other being dependent on the local light levels. As the seasons pass, the time at which it becomes necessary to switch on artificial lighting varies. As a result, it is not easy to design timer-based systems that switch lights on and off at the appropriate time, in order to maintain a desired illumination intensity. Furthermore, the light intensity produced at various locations within any particular built environment will depend not just on the strength of the daylight at any one time, but also the physical shadowing of region by the structures present in the environment.

The issues can be exemplified by considering a built environment such as a railway station. The station might comprise features such as a passenger car park, a covered pedestrian region in front of the station, a booking hall (that might have windows to the outside), a station concourse, railway platforms (usually with a some kind of overhead weather protection), waiting rooms, passenger bridges to cross over railway lines and stairs leading from the bridges to each platform. It is quite possible that some regions (e.g. the concourse, booking hall and passenger bridges) might have not only windows, but translucent roof panels, to admit natural light into the area.

Each of these areas will also have a different requirement for minimum light intensities. For example, a car park region would normally be expected to be less bright than a station concourse. A booking hall, where passengers might be transacting business and checking timetables, is likely to need higher illumination than the concourse itself. Adequate light levels will be needed on passenger bridges, but required light levels on stairs leading to and from the bridges are likely to be higher. In some situations, minimum light intensities are set by regulation, such as the light levels required within a set distance from a platform edge.

In view of all these requirements, lighting systems are controlled in a number of ways. A timer-based system may be used to switch artificial lights on and off at pre-set times. This causes difficulty as the hours of darkness vary through the seasons, and different timers would be needed for each region in the environment. A commonly used system to overcome these problems is to install light sensors in important regions that sense the intensity of local ambient light, and control the operation of local lighting. This is usually accomplished by the use of a set-point on the sensor, such that the light is switched on when light intensity drops below a desired value, and switched off when the ambient light intensity rises above a desired value. A degree of hysteresis is usually included in the controllers to prevent the control system switching lights on and off when light levels hover around the set-point, and the light sensors are usually positioned such that they are not illuminated by the light itself. This is the system that is used commonly on urban or suburban street lights, where each luminaire is provided with an upwardly-facing light sensor. The provision and maintenance of these multiple sensors is costly, and identification of an appropriate set point is often either not easy, or is difficult to change once the sensor has been installed.

It is among the objects of the present invention to attempt a solution to these and other problems.

SUMMARY OF THE INVENTION

Accordingly, the invention provides a method of estimating light intensity at a target location remote from a light sensor comprising the steps of: (a) providing a light sensor at a measuring location; (b) temporarily providing a light sensor at a target location, remote from said measuring location; (c) exposing said measuring and target locations to a plurality of light intensities; (d) constructing a calibration relationship between measured light intensity at said measuring location, and measured light intensity at said target location; and subsequently (e) measuring light intensity at said measuring location; and (f) using said calibration relationship to estimate light intensity at said target location.

Preferably, said method comprises the steps of: (a) providing a light sensor at a measuring location; (b) temporarily providing a light sensor at a plurality of target locations, remote from said measuring location; (c) exposing said measuring and target locations to a plurality of light intensities; (d) constructing calibration relationships between measured light intensity at said measuring location, and measured light intensity at each of said target locations; and subsequently (e) measuring light intensity at said measuring location; and (f) using said calibration relationship to estimate light intensity at one or more of said target locations.

In either such method, it is preferred that said light sensor at the measuring location is shielded from artificial light.

In any such method, it is also preferred that said light sensor at the measuring location is located in the open air.

The invention also provides a lighting control system for controlling light intensity at a target location, said system comprising: (a) a light sensor located at a measuring location, remote from said target location; (b) a processor; (c) a controller; and (d) a luminaire; wherein the system is configured such that the processor can: (i) receive a signal from the light sensor indicative of the light intensity at said measuring location; and (ii) use said signal and a pre-obtained calibration relationship between light intensity at a measuring location and a target location to control the activation of a luminaire via a controller, to meet a required illumination intensity at a target location, or zone.

Preferably, said light sensor at the measuring location is shielded from artificial light.

More preferably, said light sensor at the measuring location is located in the open air.

Preferably, the system is configured such that the light intensity of a plurality of such target locations may be controlled.

Preferably, any such lighting control system further comprises a data store, configured to store data relating to light intensity at periodic intervals.

Also included within the scope of the invention is a method of estimating light intensity substantially as described herein, with reference to and as illustrated by the accompanying drawings.

Also included within the scope of the invention is a lighting control system substantially as described herein, with reference to and as illustrated by the accompanying drawings.

In this specification, the term "remote", in the context of a target location being remote from a light sensor, we mean that light sensor and the target location are spaced apart from each other, but in close enough proximity to experience substantially the same pattern of incident solar radiation. For example, in some embodiments the term "remote" might include situations where the light sensor is not in a direct line of sight to a target location; or the light sensor is more than 5, 10, 20, 25, 50 or even 100 m away from a target location.

In especially preferred embodiments, the light sensor in the measuring location is preferably located in a position where it is unaffected by any artificial illumination. More preferably, the light sensor in the measuring location is positioned such that it is illuminated solely by solar radiation (i.e. sunlight or daylight), and especially unshadowed solar radiation, from the sky, i.e. "in the open air". Such a sensor could, for example, be mounted on a roof, on top of a pole, or on an unlit exterior face of a wall. In any instance, such a sensor would be preferably be mounted outside a building.

BRIEF DESCRIPTION OF THE FIGURES

The invention is described with reference to the accompanying drawings, in which.

DESCRIPTION OF PREFERRED
EMBODIMENTS

Figure 1:
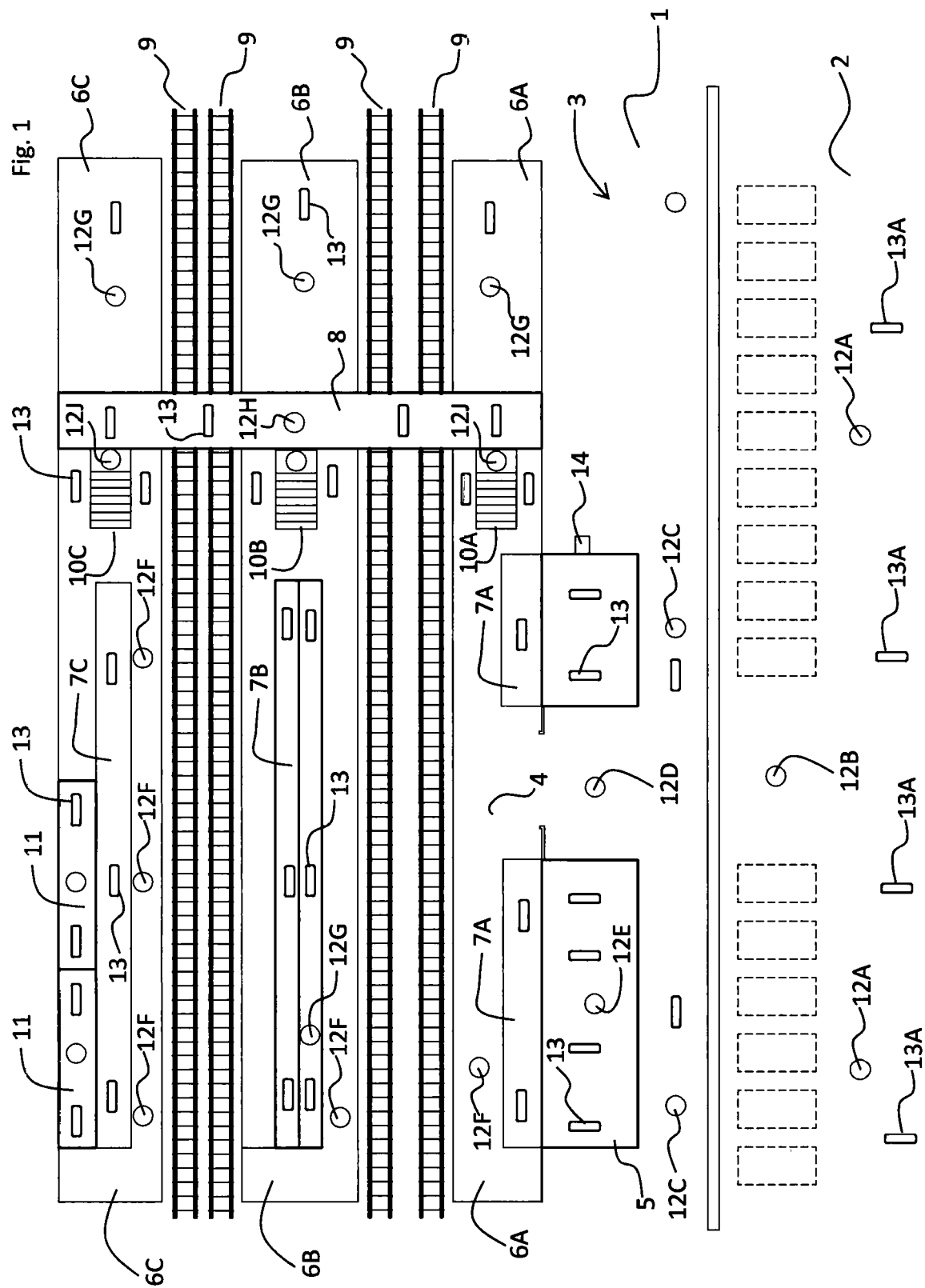
FIG. 1 illustrates, schematically, a built environment having a lighting control system using methods and systems of the invention.

FIG. 1 illustrates, in schematic plan view, an example built environment, generally indicated by 1, in the form of a railway station, to illustrate an embodiment of the invention, and the issues addressed by the invention. The environment comprises a car parking area 2, a pedestrian area 3, a concourse 4, a booking hall 5, three platform regions 6A-6C, having roof regions 7A-7C, partially covering each platform. There is also a passenger bridge 8 providing access between the platforms 6, across the tracks 9, each platform being access by a set of stairs 10A-10C. Platform 6C is provided with waiting rooms 11.

In such an environment, there are a number of different zones, 12, illustrated schematically by circles, and each having particular lighting requirements. For example, in the carpark 2, zones 12A for vehicular traffic are likely to have a lower lighting requirement than for the area of the carpark 12B used by pedestrians. Zones 12C in the pedestrian area 3 is likely to have a further, different, lighting requirement, with perhaps the entrance zone 12D requiring higher lighting levels still. Zone 12E, within the booking hall 5 might need a higher light level still. Zones 12F close to the platform edge, and likely to need a minimum lighting intensity set by regulation, whist other platform zones 12G might be acceptable with lower levels. Further zones, such as those 12H in the bridge, or on the stairs 12J, are likely to also require their own minimum light intensity.

A number of luminaires 13 are also illustrated, schematically, as rounded rectangles. These may be located in the car park (luminaires 13A), pedestrian area (12C), and located around other areas as indicated.

In this embodiment, a light sensor 14 is located at a measuring location, preferably e.g. outside, on the side of a building or on a roof or pole, and generally screened from artificial lighting sources.

It can readily be seen how this type of situation, exemplified with reference to a railway station, will also arise in other built environments such as factories, business parks, shopping centres and streets. With prior art technology, either each of the zones would require its own light sensor, or lighting levels would be sub-optimal, either in terms of safety and comfort, or in terms of energy usage.

Figure 2:
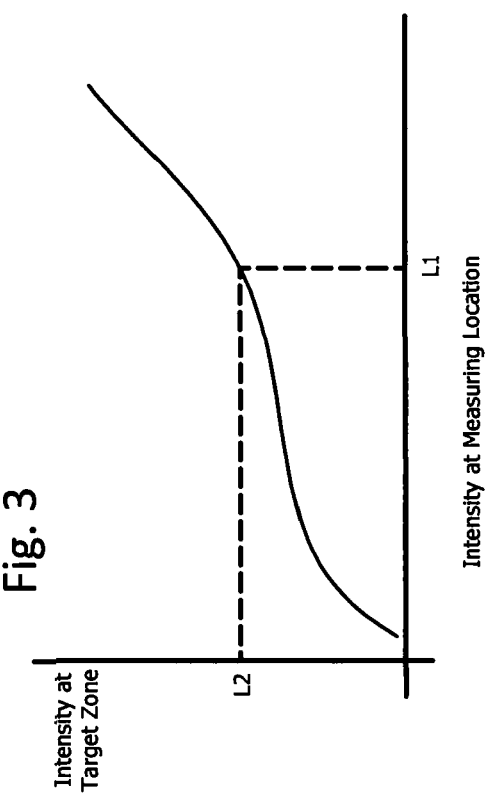
FIG. 2 illustrates typical light intensity variation at two locations within a built environment.

In a method of the invention, after installation of the equipment, a calibration phase may be undertaken. Temporary light sensors may be positioned at each target zone (12A-12J) of interest. The light intensity at each target zone of interest, and the light intensity at the operational (i.e. permanent) light sensor 14 are recorded as ambient light levels change, e.g. during a day from before dawn through the day, until nightfall. As light levels do not need to be continuously measured, rather than positioning temporary light sensors at each target zone of interest, it may be more convenient and cost-effective to use one or more portable light sensors, and move them around the environment during the day to gather the data. FIG. 2 illustrates a typical set of light measurement data that might be obtained over the course of a day, at the measuring zone and at a target zone. The intensity at the target zone will typically be lower than at the measuring zone, if the measuring zone is located in clear view of the sky, and if the target zone is receives less daylight due to adjacent buildings, roofs etc.

Figure 3:
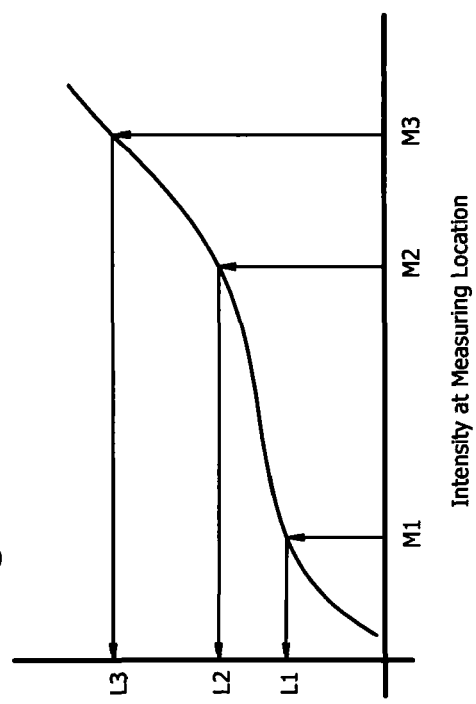

Data from this calibration phase may then be used to construct a calibration curve relating the light intensity at the measuring location to the light intensity at the target location. A typical such calibration relationship is illustrated in FIG. 3 showing how a measured light intensity L1 at the measuring location corresponds to an expected light intensity L2 at a particular target zone.

Mathematically, the calibration defines a series of functional relationships, $F_i$, between the light intensity $T_i$ at target zone i and the light intensity M at the measuring zone. In other words, $T_i = F_i(M)$. The inverse function $F_i'$ can also of course be used to determine the measured light intensity M that would correspond to a particular light intensity $T_i$ at a target zone i. In other words, $M = F_i'(T_i)$.

Using this calibration, the light intensity at each of the target zones can therefore be estimated from a single measurement at the measuring location.

If the set of desired minimum light intensities at each of the i target zones is given by $D_i$, then the calibration information can be used to convert these to corresponding light intensities $D^*_i$ at the measuring location as $M_i = F_i'(D_i)$.

Figure 4:
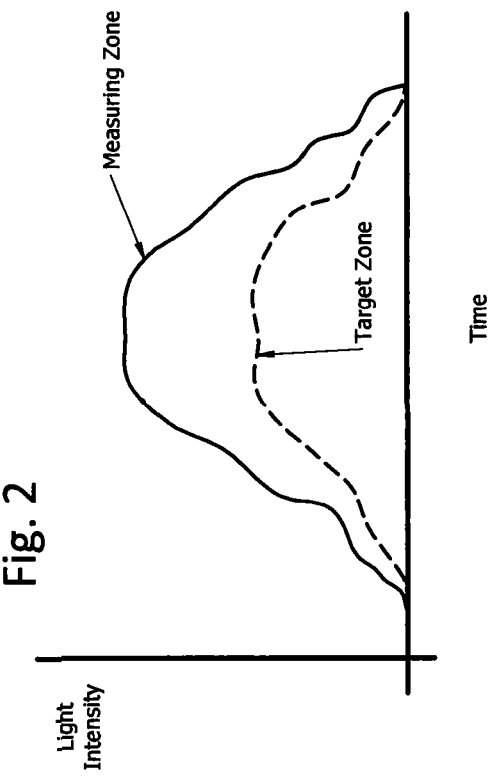
FIGS. 3-5 illustrate calibration relationships between the light intensity at a measuring location and a target location.

FIG. 4 illustrates a situation where calibrations between light intensity at a target location and light intensity at a single measuring location have been obtained for two zones. If the desired light intensity, D, at each zone is the same, then this corresponds to light intensities M1 and M2 at the measuring location. In this instance, therefore, artificial lighting illuminating zone 1 would be triggered when the light intensity at the measuring location falls below M1, whereas artificial lighting illuminating zone 2 would be triggered when the light intensity at the measuring location falls below M2.

Figure 5:
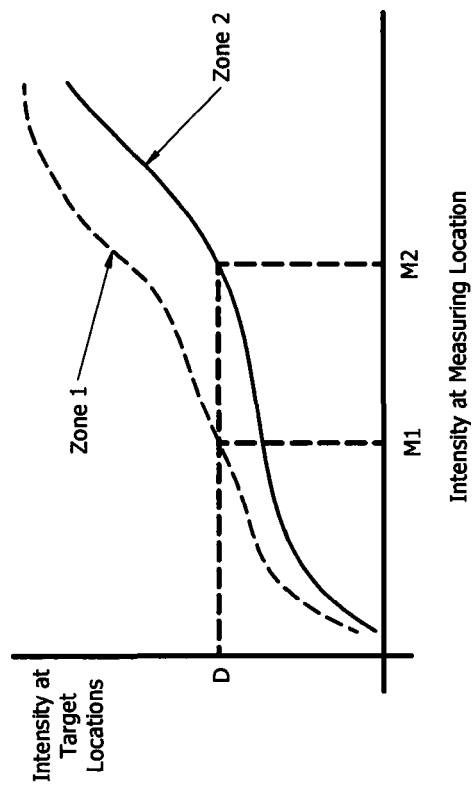

FIG. 5 illustrates that the calibration between light intensity at a measuring location and a remote target zone may be used to estimate the light intensity at one or more target zones. By use of a system as described herein, it becomes possible to efficiently control lighting within a built environment by use of a reduced number of light sensors. In some situations, only one sensor may be required.

Figure 6:
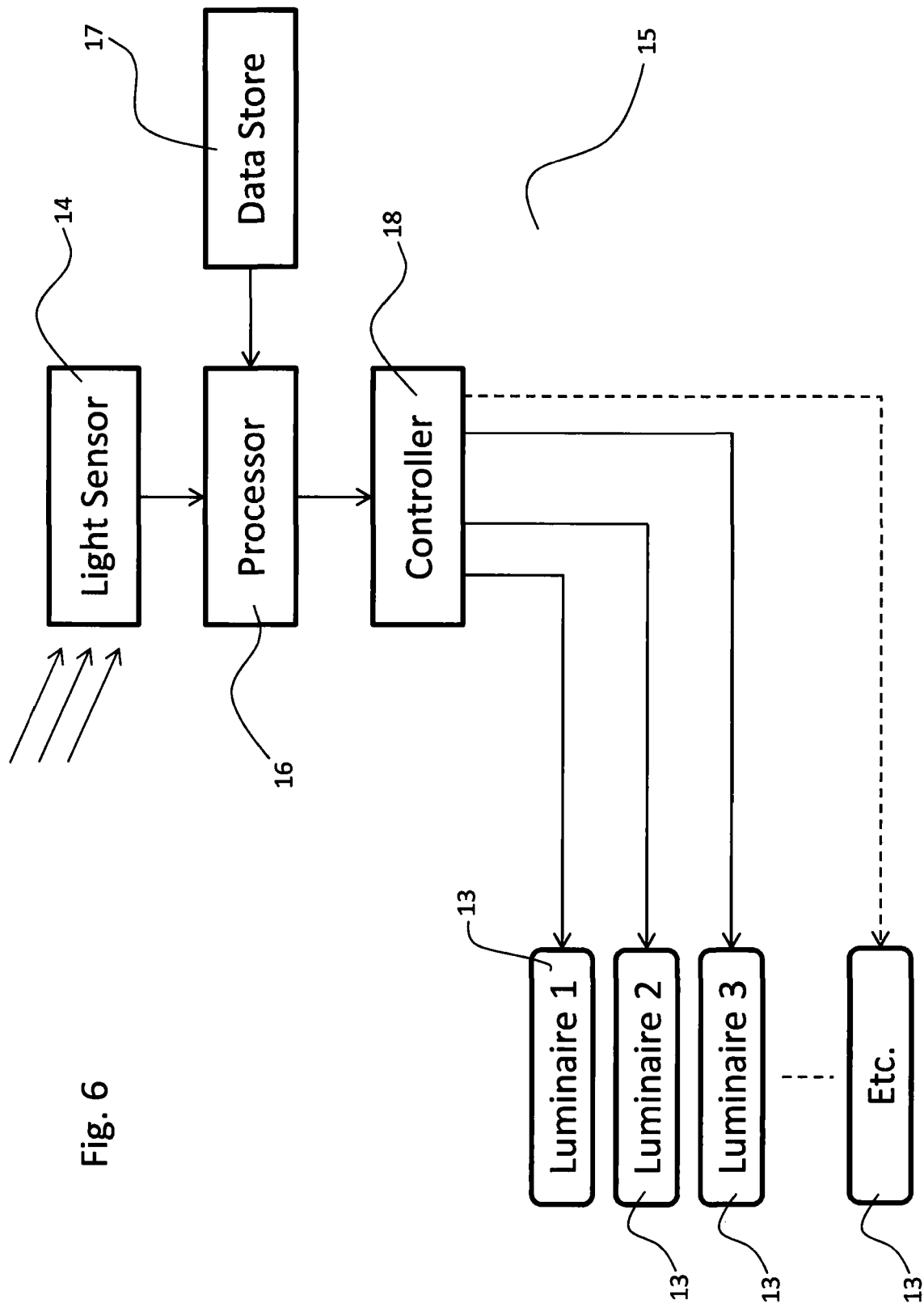
FIG. 6 illustrates a lighting control system of the invention.

FIG. 6 illustrates, schematically, a control system, generally indicated by 15, for controlling illumination levels in a built environment. The system includes a light sensor 14 for measuring incident light intensity at a measuring location. A signal representing the light intensity is transmitted from the light sensor 14 to a processor 16 that is in data communication with a data store 17. In preferred embodiments, the signal is transmitted as a digital signal, representing the light intensity at the measuring location. The processor and/or the data store may be located within the built environment under control, or may preferably be located outside the environment, e.g. as part of a distributed control system controlling a plurality of such built environments. In this case, the signals may readily be transmitted e.g. via the internet, or via radio communication.

The data store 17 contains set point information about the required illumination intensity at each of the target zones to be controlled. This may be stored as a representation of the desired intensity $D_i$ at each zone, or as the corresponding intensity at a measuring location, $D_i^*$. Alternatively, the previously-obtained calibration relationship between the light intensities at each target zone and the measuring zone may be stored, and used to convert the incoming signal, M, from the sight sensor 14 to corresponding intensities, $T_i$, at the target zones by use of the relationship $T_i = F_i(M)$, as described above.

In this way, the processor may be configured to control, via a controller 18 (e.g. in the form of relays) individual or groups of luminaires 13, located to illuminate particular zones. Again, signal transmission between the processor 16 and the controller 18, or between the controller 18 and each luminaire may be wired locally, within the built environment to be controlled, transmitted over the internet, via radio communication, or by a combination of all or any of these means.

In further preferred embodiments, the system may be configured to store data collected from the light sensor 14, for future analysis. For example, if the normally automatic luminaires are further equipped with a manual override, this enables the facilities manager of the site to identify the light intensity around the site that triggered the use of the manual override. Action can then be taken (e.g. training of staff) if the manual override was inappropriately actuated. Alternatively, the desired set points of the system may be amended such that the system is controlled in a more desirable way.

The invention claimed is:

1. A lighting control system, comprising:
   a light sensor located at a measuring location for measuring a first light intensity at said measuring location, wherein said light sensor is remote from a first target location and a second target location, wherein said first target location has a first required illumination intensity associated therewith and said second target location has a second required illumination intensity associated therewith;
   a processor;
   a controller; and
   a first luminaire, wherein said first target location is associated with said first luminaire;
   a second luminaire, wherein said second target location is associated with said second luminaire;
   wherein said lighting control system is configured such that said processor can:
   receive a signal from said light sensor indicative of said first light intensity at said measuring location; and
   use said signal and a pre-obtained calibration relationship between said first light intensity at said measuring location, a second light intensity at said first target location, and a third light intensity at said second target location to control activation of said first luminaire and said second luminaire via said controller, to meet both said first required illumination intensity at said first target location and said second required illumination intensity at said second target location.

2. The lighting control system according to claim 1, wherein said first light sensor at said measuring location is shielded from artificial light.

3. The lighting control system according to claim 1, wherein said first light sensor at said measuring location is located, in open air.

4. The lighting control system according to claim 1, wherein said lighting control system is configured such that said first light intensity of said first target location and said second light intensity of said second target location may be controlled.

5. The lighting control system according to claim 1 further comprising a data store, configured to store data relating to said first light intensity at periodic intervals.

* * * * *